(12) United States Patent
El-Moussa

(10) Patent No.: US 8,966,631 B2
(45) Date of Patent: Feb. 24, 2015

(54) DETECTING MALICIOUS BEHAVIOUR ON A COMPUTER NETWORK

(75) Inventor: Fadi El-Moussa, Ipswich (GB)

(73) Assignee: British Telecommunications PLC, London (GB)

( * ) Notice: Subject to any disclaimer, the term of this patent is extended or adjusted under 35 U.S.C. 154(b) by 0 days.

(21) Appl. No.: 13/202,424

(22) PCT Filed: Feb. 23, 2010

(86) PCT No.: PCT/GB2010/000322
§ 371 (c)(1),
(2), (4) Date: Aug. 19, 2011

(87) PCT Pub. No.: WO2010/097575
PCT Pub. Date: Sep. 2, 2010

(65) Prior Publication Data
US 2011/0302656 A1 Dec. 8, 2011

(30) Foreign Application Priority Data
Feb. 24, 2009 (EP) ..................................... 09250487

(51) Int. Cl.
*G06F 21/00* (2013.01)
*H04L 29/06* (2006.01)
(52) U.S. Cl.
CPC ........ *H04L 63/1425* (2013.01); *H04L 63/1416* (2013.01); *H04L 2463/144* (2013.01)
USPC .................. 726/24; 726/22; 726/23; 713/187; 713/188; 709/223; 709/224; 709/225
(58) Field of Classification Search
USPC ........ 726/22–25; 713/187–188; 709/217–229
See application file for complete search history.

(56) References Cited

U.S. PATENT DOCUMENTS

| 6,901,519 B1 | 5/2005 | Stewart et al. | |
| 7,260,843 B2 * | 8/2007 | Hentunen | 726/22 |
| 7,984,493 B2 * | 7/2011 | Jones | 726/12 |

(Continued)

FOREIGN PATENT DOCUMENTS

WO   WO 2007/010395   1/2007

OTHER PUBLICATIONS

Packet Vaccine: Black-box Exploit Detection and Signature Generation by Wang et al; Publisher: ACM; Year: 2006.*

(Continued)

*Primary Examiner* — Madhuri Herzog
(74) *Attorney, Agent, or Firm* — Nixon & Vanderhye PC

(57) ABSTRACT

A malicious behavior detector (100) for detecting malicious behavior on a network, comprises a processor unit (120) and associated system memory (130) containing computer program code. The computer program code provides a signature matching module (132) to perform malicious partial signature detection by reading the contents of packets of data passing through the network to look for partial signatures associated with malicious programs; a Domain Name Service, DNS, request and/or response detection module (134) to monitor the requests made by hosts connected to the network and/or responses thereto; and an evidence assessment module (138) to analyze the results of the partial signature detection and the DNS monitoring make a determination of the suspected presence of malicious behavior on the network based upon the analysis of the results of both the partial signature detection and the DNS monitoring.

6 Claims, 4 Drawing Sheets

(56) References Cited

U.S. PATENT DOCUMENTS

| | | | |
|---|---|---|---|
| 2004/0123141 A1 | 6/2004 | Yadav | |
| 2005/0060535 A1* | 3/2005 | Bartas | 713/154 |
| 2005/0185668 A1* | 8/2005 | Williamson et al. | 370/464 |
| 2005/0265331 A1* | 12/2005 | Stolfo | 370/389 |
| 2006/0137012 A1 | 6/2006 | Aaron | |
| 2007/0064617 A1 | 3/2007 | Reves | |
| 2008/0005782 A1* | 1/2008 | Aziz | 726/3 |
| 2011/0093951 A1* | 4/2011 | Aziz | 726/24 |
| 2013/0036472 A1* | 2/2013 | Aziz | 726/24 |

OTHER PUBLICATIONS

The Domain Name Service as an IDS by Schonewille et al; Publisher: University of Amsterdam; Date: Feb. 5, 2006.*
A Malware Signature Extraction and Detection Method Applied to Mobile Networks by Hu et al; Publisher: IEEE; Year: 2007.*
Botnet Detection by Monitoring Group Activities in DNS Traffic by Choi et al; Publisher: IEEE; Year: 2007.*
Service Specific Anomaly Detection for Network Intrusion Detection by Krugel et al; Publisher: ACM; Year: 2002.*
International Search Report for PCT/GB2010/000322, mailed Apr. 29, 2010.
Pasupulati, A. et al., "Buttercup: On Network-based Detection of Polymorphic Buffer Overflow Vulnerabilities", 2004 IEEE (14 pgs.).
Hamad Binsalleeh and Amr Youssef, "An Implementation for a Worm Detection and Mitigation System", Concordia Institute for Information Systems Engineering, Concordia University, Montreal, Canada, (date unknown) (4 pgs.).
Antoine Schonewille and Dirk-Jan van Helmond, "The Domain Name Service as an IDS", Research Project for the Master System and Network Engineering at the University of Amsterdam, Feb. 5, 2006 (24 pgs.).

* cited by examiner

DETECTING MALICIOUS BEHAVIOUR ON A COMPUTER NETWORK

This application is the U.S. national phase of International Application No. PCT/GB2010/000322 filed 23 Feb. 2010, which designated the U.S. and claims priority to EP Application No. 09250487.7 filed 24 Feb. 2009, the entire contents of each of which are hereby incorporated by reference.

FIELD OF THE INVENTION

The present invention relates to a method and apparatus for detecting malicious behaviour on a computer network and in particular to a method and apparatus for detecting so called "worms" travelling over a computer network and attempting to "infect" "victim" hosts connected to the network using a buffer overflow exploit, in particular.

BACKGROUND TO THE INVENTION

There is a significant amount of malicious behaviour over the Internet today. In the present application when reference to malicious behaviour means activities in which a host device connected to a network is attacked by some malicious code which attempts to install itself onto the victim device and then carry out functionality which the legitimate user of the device is not aware of and which is done for the benefit of a third party rather than for the benefit of the legitimate user of the host device. Important examples include computer viruses, computer worms and computer Trojans. A computer virus is generally considered to be a piece of malicious executable code that requires a host file (e.g. a program or a document) in order to propagate, a computer worm is similar except that it can replicate and propagate itself from one host on a network to another without needing to be embedded within a host file, and a Trojan is an executable file (i.e. a computer program) which appears to be useful but in fact has some ulterior function which it carries out when executed which is unknown to the legitimate user.

One common use of worms by malicious parties is to infect a large number of victim computers to form so-called "botnets" in which each infected computer is referred to commonly as a "zombie". Such Botnets of zombies can then be used to perform malicious activities where the use of a large number of computers acting in concert is of benefit—for example such botnets are known to be used for sending spam emails or for carrying our Distributed Denial Of Service (DDOS) attacks, etc.

Most anti-virus software used today is software which is host-based (i.e. it resides on a host device) and is signature based, which means that it scans through files stored on the host computer (or just received on the computer e.g. by way of an attachment to an email, etc.) and checks the contents of each file against a dictionary of virus signatures. Note that generally the virus signature is the viral code. So finding a virus signature in a file is equivalent to finding the virus itself).

Relatively recently research has been conducted on the possibility of detecting malicious behaviour on a network by observing Domain Name System (DNS). An example of a recent technical paper investigating this idea is "The Domain Name Service as an IDS" by Antoine Schonewille and Dirk-Jan van Helmond published in 2006, a copy of which can be found at the following Internet location http://staff.science.uva.nl/~delaat/snb-2005-2006/p12/report.pdf at the priority date of the present application and the contents of which are hereby incorporated by reference. From this paper it is clear that an analysis of DNS requests is not considered to be a very reliable approach on its own because of the occurrence of many false positives. It suggests that this technique should instead be used with other behaviour monitoring techniques such as detecting connections being made to known blacklisted sites (where a botnet controller might be operating), in particular it suggests using the NetFlow tools (and more specifically the nfDump tool) to operate in combination with DNS request analysis the latter being able to provide more useful information to an administrator who is alerted to the potentially suspicious behaviour of an infected host.

US 2004/0123141 describes a dynamic multi-tier intrusion detection system for a computer network in which a hierarchy of agents at different levels co-operate to identify malicious behaviour on a network. A number of local intrusion detection agents each communicate with a single network intrusion detection agent, while a number of network intrusion detection agents all co-operate with a single global intrusion detection element. The system can identify malicious behaviour based not only on classic signature detection (i.e. detecting a match with content of incoming packets of data to known content comprising malicious software code) but also on suspicious network behaviour, especially since if a number of local agents detect or behave in similar manners, this can be detected and deemed suspicious by one of the agents higher up in the hierarchy (e.g. a network or global agent).

WO 2007/010395 describes a DNS gatekeeper system which prevents outbound connections from being made unless they are initiated after making a DNS enquiry. Normal outbound connections it is suggested are made only after performing a DNS lookup however this is said to be not generally the case for malicious programs.

SUMMARY OF THE INVENTION

According to a first aspect of the present invention, there is provided a method of detecting malicious behaviour on a network, the method comprising performing malicious partial signature detection by reading the contents of packets of data passing through the network to look for partial signatures associated with known malicious programs; monitoring the Domain Name Service, DNS, requests made by hosts connected to the network; and making a determination of the suspected presence of malicious behaviour on the network based upon an analysis of the results of both the partial signature detection and the DNS monitoring (steps).

Preferably the method is carried out by a device within the network rather than in a host device.

By partial signature detection it is meant that instead of looking for the entire virus code being transmitted over the network, only a portion of such code is looked for; most preferably only a very small portion of the virus code is looked for such as a memory location (the significance of this is discussed below).

Looking for only a part of a virus signature can be advantageous because it may be possible to find a key part of the virus that is common to all related variants of a particular virus strain, and even of all forms of metamorphosing viruses. Furthermore, and of special benefit in the present invention, if a key part can be found which is less than a common packet size of packets travelling through the network, it may be possible to look for such partial signatures on a packet by packet basis rather than having to maintain information about entire flows of data etc as might otherwise be required to perform signature detection within a network rather than on a host device.

Of course, the disadvantage of using such a small portion only of a virus for signature detection is that the method is much more likely to generate many false positives. This disadvantage is however mitigated in the present invention by the cooperative use of the DNS monitoring. By combining the evidence from both techniques many false positives can be ruled out, greatly reducing the total number of false positives generated by the method. Furthermore, DNS request monitoring is well suited to being carried out within a network and so the method as a whole may conveniently be carried out within a network, which has significant benefits over host based methods (e.g. e.g. the network administrator need not rely on the diligence of the host user in keeping anti-virus software up-to-date, the burden on individual host users is reduced, the networks broader perspective on the overall behaviour of the network as a whole can be leveraged, etc.).

According to a second aspect of the present invention, there is provided a method of detecting malicious behaviour on a network comprising inspecting the contents of packets of data travelling through the network and attempting to detect the presence of data representing a memory location corresponding to a known memory location or range of memory locations in which a known system program is known to execute on a given type of system, and upon making such a detection checking for suspicious behaviour from one or both of the source or destination host of the packet and, upon detecting such suspicious behaviour, determining that there is a risk of the respective source and or destination device having been infected by a malicious program.

Stating that the known memory location corresponds to a known range of memory locations means that the known memory location is any one of the memory locations within the known range of memory locations.

The invention provides significant benefits over known systems such as described in US 2004/123141 which look for entire signatures (e.g. entire sections of malicious code) because the vulnerable memory location or number of memory locations within a given range of memory locations are relatively static and cannot be obfuscated (e.g. by encryption or code morphing) if the attack is to work. Therefore the present invention is able to detect even sophisticated rapidly morphing polymorphic viruses as well as zero day attacks (i.e. before a virus has been recognised and it's signature identified).

The suspicious behaviour used to provide confirmation of a detection resulting from a partial signature detection based on a known vulnerable memory location having been matched to may be the making of an unusual number or type of DNS requests, or attempting to access a server which is known to be blacklisted or otherwise suspected to be a malicious server (e.g. by sending a packet to an IP address known to be blacklisted or otherwise suspicious), etc.

It has recently been established that on certain operating systems (e.g. various versions of the Windows™ Operating Systems produced by Microsoft Corporation) certain system programs (e.g. Dynamic Link Libraries (DLL's)) are always loaded into the same memory address of a system's memory when executed. This fact can be exploited by malicious users seeking to infect a victim computer. A particularly common way of using this information currently is in developing a buffer overflow exploit. In such an exploit, knowledge of the memory location at which a particular system program (which is known to be used by a particular known application—e.g. a File Transfer Protocol (FTP) server application) is loaded into the system memory can be used to improve the chance of a malicious piece of code being successfully run without detection by the victim host.

An analysis of a number of polymorphic/metamorphic worms using such tactics performed by the present inventors has shown that in general although the actual program run by the worm (in particular the shell code portion) may vary considerably, in order for the exploit to work correctly, the worm needs to include the memory location associated with the target system program (e.g. a DLL) in the clear (i.e. in non-obfuscated form, where obfuscation means, of course, any sort of obscuring including encryption). This therefore represents an excellent mini-signature of a piece of malicious code. Of course, since a system memory location is normally expressed as a fairly short binary number (e.g. a 32 bit number) there is a significant risk of a particular series of bytes matching a known vulnerable memory location entirely by accident. However, this risk is still relatively small (e.g. finding the binary representation of any one of up to 1000 identified memory locations by chance should have a probability of less than 0.00001 percent for a random binary sequence) and can be reduced by simple measures such as looking for adjacent byte symbols that normally have to accompany the memory location in the malicious code in order for it to be correctly interpreted, checking that the protocol being used for encoding the contents of the packet are correctly understood to avoid false detection based on obscure encodings, etc. Generally the more such corroborative checking as is done, the more costly in terms of processing resource required by the matching hardware performing the checking, but the lower the risk of getting accidental false positives etc. and the final balance selected is a matter of choice for a particular network given the size of the network and the available hardware for performing the checking etc.

Embodiments of the present invention provide a number of technical benefits in the field of detecting malicious behaviour. For example they can detect infections after only a single infection attempt, they can detect worms on day zero (i.e. as soon as a worm appears regardless of whether or not it has already been analysed by security experts. They can detect polymorphic worms. They can be made to have an arbitrarily low false positive rate, and they are relatively easy to implement in most network architectures.

Further aspects of the present invention relate to corresponding apparatus for carrying out the methods of the first and second aspects of the present invention as set out in the accompanying claims, and to computer programs for causing the methods to be so carried out when executed on appropriate hardware as well as to media, most preferably tangible media such as magnetic or optical storage devices (e.g. cd's, dvd's, magnetic hard drives, etc.) or solid state storage devices, storing such programs.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS OF THE INVENTION

Figure 1:
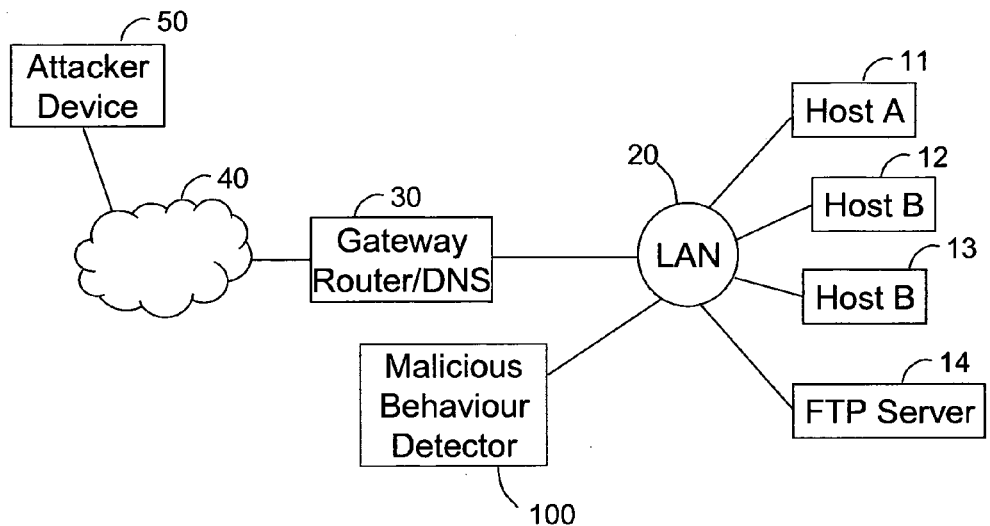
FIG. 1 is a schematic illustration of a computer network implementing an embodiment of the present invention.

FIG. 1 illustrates a typical network architecture comprising a Local Area Network (LAN) 20 (e.g. an IEEE 802.3 Ethernet LAN) connected, via a gateway/router device 30 (which also acts as a proxy DNS server in the present embodiment) to the Internet 40. Connected to the Internet 40 is an attacker device 50 (which might for example be an infected device) where a worm is trying to spread to a new victim. Also attached to the LAN 20 are several host devices 11-14, one of which 14 is running an FTP server and is the current target of the attacker device 50.

Figure 2:
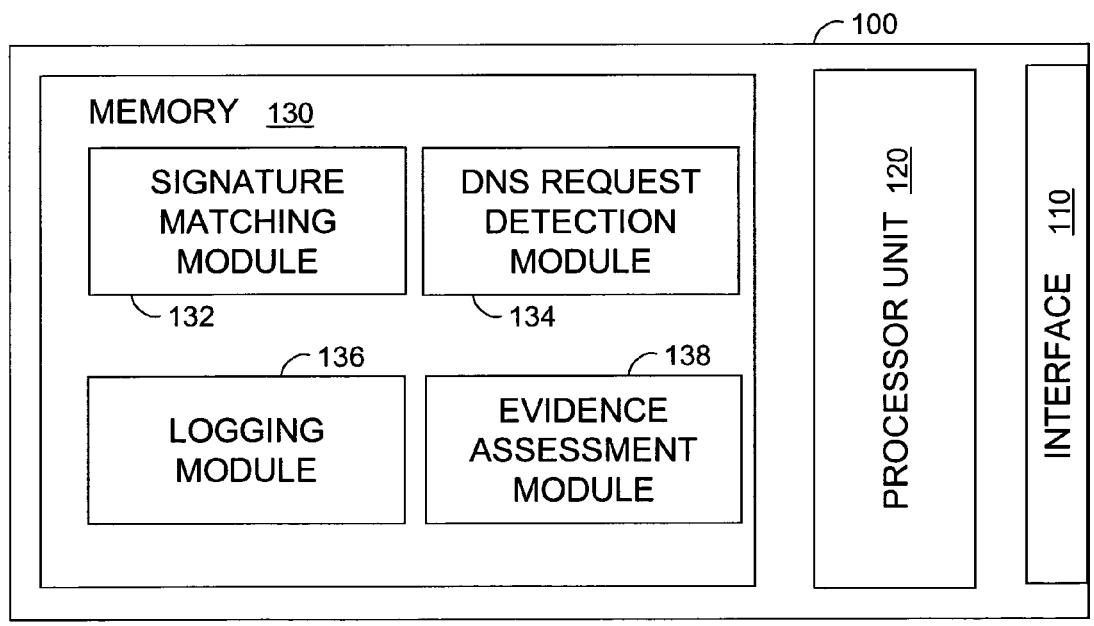
FIG. 2 is a schematic illustration of the Malicious Behaviour Detector of FIG. 1.

The LAN 20 also has connected to it a Malicious Behaviour Detector device (MBD) 100 which is the principal subject of the present embodiment, and it is schematically illustrated in greater detail in FIG. 2. Referring now to FIG. 2 therefore, the MBD 100 comprises an interface 110 for communicating with the LAN 20, a processor unit 120 for performing processing functions and a memory 130. The processor unit 120 co-operates with the memory 130 to perform processing functions based on computer program instructions stored in the memory. In particular, in the present embodiment the memory stores sets of computer program code means 132, 134, 136 and 138 each of which causes the processor unit to perform different functions when executed by the processor means. The four functional modules are a signature matching module 132, a DNS request detection module 134, a logging module 136 and an evidence assessment module 138.

In overview, the MBD generally operates in a listening mode (in particular by setting an Ethernet network adapter component forming part of the interface 110 into a listening mode) such that all traffic travelling over the LAN 20 is received by the MBD 100 and all received Ethernet frames are processed in a manner determined by the functional modules 132, 134, 146 and 138.

In particular, signature matching module 132 causes the MBD to inspect all received Ethernet frames to see if they contain data which matches one of a predetermined number of suspicious signatures contained in a list of signatures which is also stored in the memory 130. As discussed above, in the present embodiment, these signatures, instead of being fairly long as with most prior art signature detection methods/apparatus which look for an entire malicious program, are relatively short and preferably comprise memory address locations which may be only a matter of 32 bits or so in length (for 32 bit operating systems such as Windows XP 32 bit editions) or 64 bits in length (for 64 bit operating systems such as Windows Vista or Windows 7 64 bit editions). Naturally, the signature matching module 132 also permits the list of signatures (which are checked for against Ethernet frames passing through the LAN) to be updated by an administrator or automatically from an appropriate updating server (in a manner similar to the way in which modern anti-virus software automatically updates itself), etc. in order to keep the list current.

Preferably, the signature detection is based on detecting a vulnerable memory address (appearing in payload data) which a worm is trying to use as part of a buffer overflow attack. From malware analysis studies carried out by the present inventor, it has been determined that many modern polymorphic worms change their shellcode but do not (probably because it is not possible to do so and to still be effective at infecting the target) change the exploit memory address which the worm targets as part of the buffer overflow process.

In order for a worm to infect a host it has to exploit a vulnerable memory location in the application memory address. In many situations that memory location cannot be changed; altered or even obfuscated (e.g. encrypted) otherwise the exploit fails and the worm is not able to infect the vulnerable host. For example, some specific type of worms are targeting the address memory 0x71ab9372 (==111 0001 1010 1011 1001 0011 0111 0010 in binary) on host devices running the windows XP operating system with service pack 2 installed in order to exploit the system and have full control over it. In order for the vulnerability to work and the worm to be able to infect more machines and thus spread, it has to use that instruction and that address of Windows XP with Service pack 2. Therefore, to detect a polymorphic worm, a traffic classifier may be strategically placed to classify packets based on IP address, protocol, and port numbers then to scan the packet payload looking for that address that is known to be vulnerable (such addresses are often used as return addresses to point to a place in the working memory of the host device where malicious code has been inserted by the worm and where system is prepared to go because it knows it relates to a place in the memory where a legitimate application (e.g. a DLL) should normally reside). So in that way, even if an attacker uses sophisticated obfuscation to hide his/her code, it is still possible to detect the attack traffic by looking into the packet payload and identifying those vulnerable addresses. In addition, for the attacker to make sure that he is targeting a fixed memory address then he needs to examine the Dynamic Link Libraries (DLL) libraries the application is using. The present inventor has established that Dynamic Link Libraries (DLL)'s are always loaded into the same memory locations in the same Windows OS, (for a given set of service pack versions and patches having been installed). In order for the worm to successfully inject its malicious code into the host memory it generally has to use a memory address pointer that points to the fixed memory location and therefore it generally has to use the same DLL memory location.

Attackers may try to evade signature based intrusion detection using obfuscated code that changes every time it infects the system. However, in many cases as analysed by the present inventor, even though an attacker can obfuscate the malicious shellcode s/he still needs to send the fixed memory location in the clear with no obfuscation or other changing (e.g. encryption or scrambling) otherwise the code is not able to exploit the buffer overflow vulnerability to inject its malicious code and run the code successfully.

Similarly, the DNS request detection module 134 inspects all Ethernet frames which contain a DNS query (DNS queries are generally sent in a User Datagram Protocol (UDP) datagram encapsulated in an Internet Protocol (IP) packet(s) and so it is necessary to perform relatively deep packet inspection to ascertain whether or not a given received frame contains a DNS request. This is straightforward and well understood within the art (note also that it is preferred if the signature matching module 132 also performs deep packet inspection to avoid accidentally finding a match to some innocent set of bits that is, for example, simply part of a header for a protocol rather than part of a payload, etc. and in this case the same functionality can be used to pre-process the received frames to identify first if they are DNS requests in which case they are sent to the DNS request detection module for further processing as described below, and otherwise any payload data is sent to the signature matching module 132 for processing to see if the payload data contains any of the listed signatures). Having identified a DNS request, the DNS module 134 checks to see if the address to be resolved is a known blacklisted name (or, in the case of a DNS response if the response includes a known blacklisted IP address—such lists can be obtained form a central source available freely over the Internet—see for example the list of known malicious IP addresses contained at the following URL http://www.dshield.org/sources.html) i.e. a domain name (or an IP address) which is known to be associated with a command and control server or is otherwise known to be malicious, etc. If so, it alerts the evidence assessment module of this fact directly and then sends details of the DNS message (request or response) to the logging module 136 for logging; otherwise, it just sends details of the message to the logging module 136 for logging without directly alerting the evidence assessment module 138. Note that in alternative embodiments it would be perfectly acceptable to simply send the details of all DNS messages to the logging module for logging without directly alerting the evidence assessment module directly since it will very quickly come to learn about the message in any event via the logging module as explained below.

The logging module 136 is responsible for causing the MBD 100 to log all "interesting" activities detected by the MBD 100. Thus whenever the signature matching module detects the presence of a signature which appears in its list of signatures to be matched, details of the match (especially the socket pair details if the signature is carried in a message being transported using TCP or UDP—i.e. the IP addresses of the source and destination and the port numbers of the source and destination, but as a minimum the IP addresses of the source and destination should be recorded—as well as other interesting details such as the timestamp of the ethernet frame in which it was found and the MAC addresses of the source and destination of the Ethernet frame in which the signature was found together with the identification of the application responsible for generating the message to be sent and/or the application to which the message is directed on the destination host) are passed to the logging module 136 for logging. Similarly, whenever a DNS message is detected, details of the DNS message (especially the IP addresses of the source and destination—which may not be associated with devices on the LAN 20- and the MAC addresses of the sending and target devices—which normally should both be associated with devices on the LAN 20 unless connected together by some sort of Ethernet bridge, etc.). Additionally, whenever any new details are logged by the logging module, the logging module 136 is responsible for ensuring that the evidence assessment module 138 reconsiders the new evidence in light of the old. An alternative solution would be to have the evidence assessment module simply perform assessments on a periodical basis based on the evidence logged by the logging module since the last assessment—such an approach would reduce the risk of the MBD being overwhelmed by a large number of messages being logged very quickly if the processor was not capable of performing the evidence assessment processing sufficiently quickly to cope with such rushes of work, but risks a slow reaction time to the detection of malicious behaviour if the time between assessments is too long, Therefore some sort of compromise where some messages are acted upon immediately, while others are simply logged and processed on a periodic basis may be appropriate.

The evidence assessment module 138 is responsible for assessing the "evidence" (i.e. the details of messages logged by the logging module) to determine if a notification should be sent to a network administrator as well as for sending the appropriate amassed evidence as part of the notification so that the administrator can take an informed decision on what to do next (if anything). In alternative embodiments instead of or as well as notifying an administrator of the evidence for considering that some malicious behaviour has taken place, the MBD could take some action on its own, automatically, to prevent or reduce any such suspected malicious behaviour. For example, it could try to instigate the blocking of all traffic coming from an IP address suspected of sending malicious packets of data (e.g. by sending a message to the gateway/router device 30 connecting the LAN 20 to the Internet 40 to not forward on any traffic coming from a specified external IP address (e.g. from the IP address associated with device 50) because it is suspected of being associated with a malicious device (e.g. device 50).

In the present embodiment, the evidence assessment module 138 determines that there is likely to be malicious behaviour occurring if either it detects a signature match in a received Ethernet frame, or if it detects a DNS request or response associated with a black-listed domain name or IP address. Clearly, neither of these is absolutely determinative of the fact that malicious behaviour has occurred (i.e. they are susceptible on their own to produce "false positives" i.e. incorrect indications of malicious behaviour) and so a single event of this nature is in the present embodiment associated with a certain likelihood of malicious behaviour having been detected. The individual likelihoods associated with different "events" or pieces of evidence can then be combined to give an overall likelihood of malicious behaviour having occurred. This could, for example, be done by assigning a probability to each piece of evidence and then combining them in a chain-like manner to give an overall likelihood for malicious behaviour having been detected—i.e. if a string is matched this could represent a 0.6 probability of malicious behaviour occurring (hereinafter prob (A)), if a DNS request for a known blacklisted server is then observed coming from the same source, this event could have a probability associated with it of 0.8 (hereinafter prob (B)), these two probabilities can then be combined using a formula such as likelihood=prob(A)+(1−prob(A))*prob(B). This formula can be iteratively extended to account for further evidence as it is observed using new likelihood=current likelihood+prob (new evidence)*(1−current likelihood). In the case mentioned above where prob A=0.6 and prob B=0.8 we have likelihood=0.8+(1−0.8)*0.6=0.6+(1−0.6)*0.8=1−((1−0.8)*(1−0.6))=0.92. If further evidence is amassed having an assigned probability of 0.1, this can be accounted for by setting new likelihood=0.92+(1−0.92)*0.1=1−((1−0.8)*(1−0.6)*(1−0.1)=0.928.

Preferably, the likelihood is increased if there is evidence of more than one type (i.e. in the present embodiment if there is DNS-related evidence and signature detection based evidence). This could be done by increasing the likelihood of all existing evidence by a certain weighting (e.g. increasing all evidence likelihoods by 10%) or by considering the presence of evidence of different types as a new piece of evidence in its own right (e.g. with a likelihood of say 25% or some other administrator configurable amount).

In addition to detecting a DNS message which relates to a known malicious IP address or domain name, other types of DNS activity can also be considered as being suspicious and, in the present embodiment, are assigned a (fairly low) probability which can contribute to the overall likelihood of malicious behaviour being present. For example, as explained in detail in the above referenced document by Antoine Schonewille and Dirk-Jan van Helmond, such behaviour could include any or all of the following types of behaviour:

detecting a significant change in the number of DNS requests issued by a particular host (this can be monitored by keeping a record of the top n hosts in terms of the number of DNS requests they send and adding a small probability to any hosts which enter the top n list—preferably such evidence should time out if no further corroborative evidence is found within a certain period of time—e.g. within 4 hours) with perhaps a relatively low probability assigned to this evidence of say 0.1 (i.e. 10%)

simultaneous or near simultaneous querying by a number of different devices for the same (unknown) domain name (of course this could also be perfectly innocent behaviour by a number of users who have all been simultaneously made aware of a new domain name that they wish to visit—so again a fairly low probability should be assigned to such activity—e.g. 0.1 or 10% again)

periodic requests for the same (unknown) domain name as this could be an indication of software issuing the requests rather than human users (who do not tend to be systematic in making their requests—again no more than 0.1 should be assigned to this "evidence" as its probability). One point to note however is that most legitimate web servers do not change their IP address very frequently and therefore often have fairly long Time To Live (TTL) periods set. Since almost all DNS resolvers (locally situated on the host and used by most legitimate applications—e.g. web browsers—for resolving DNS queries) perform caching of DNS responses for the specified TTL, the fact that an external request needs to be sent regularly for the same domain name, suggests that it has a low TTL. This in itself can be indicative of malicious behaviour because command and control servers for malicious computer worms and zombie botnets, etc. tend to frequently change their IP address to avoid having their IP address blackholed, thus frequent i.e. more than one per hour, DNS requests to resolve the same domain name can also be considered as evidence of malicious behaviour, and similarly DNS responses which, provide different IP addresses in response to the same domain name could also indicate that the domain name relates to a malicious server and so should count as evidence in the present embodiment use of non-standard DNS resolver/Name server—generally each host has a resident standard DNS resolver which is part of the host's operating system and that is configured to use a specified DNS name server which will normally be one specified by the LAN administrator or by the user's ISP. If a host suddenly starts using non-standard DNS resolvers or name servers this is likely to be a result of a malicious program acting (e.g. a worm) and thus such behaviour should be treated as evidence of malicious behaviour (with e.g. a probability of 0.25). Note it is not guaranteed to be a reliable indication of malicious activity because, for example, the host could merely have started using a local DNS name server which might be by-passing the local (proxy) DNS server (i.e. the "standard" DNS Name Server for that host) and going straight to the respective authoritative root servers when its local cache cannot answer a particular query etc.—none-the-less although not an entirely reliable indicator it is often a good indicator, especially if backed up with further evidence Another good indicator of possible malicious behaviour is if the DNS queries have an uncommon qtype. In general, most legitimate DNS queries have qtype A. Occasionally hosts may want to make a query with qtype MX. A normal host would not normally need to make a request with any other qtype (e.g. AXFR or IXFR which request information about zones rather than simply about individual domains, etc.). Thus if requests are detected with unusual qtypes this again is good evidence of the possibility of malicious behaviour although it could result from the host having a DNS server operating locally, etc. Thus a probability associated with this event of about 0.25 might again be appropriate (note this would not be assigned to all individual requests having a non-standard q-type, but rather should be done on a one off basis when one is detected for the first time for a particular host—an improvement might be to have an initial fairly high probability for the first request of a particular (non-A) type and then to increment this (e.g. with an assigned probability of 0.01) for each subsequent request detected of the same (non-A) type. Possibly, different (non-A) types could each have an associated fairly high probability (e.g. of 0.1 or 0.2) for the first detection of such requests and then a much smaller incremental prob (e.g. of 0.01) for each subsequent response of that qtype which is detected.

Other possible types of behaviour that could indicate the presence of malidious behaviour such as those described in the cited document by Schonewille et al. or in the other documents referred to in that paper, etc. will occur to the skilled reader and can all be easily incorporated into an embodiment of the present invention.

As mentioned above, in order to ascertain whether or not sufficient evidence of malicious behaviour has been gathered with respect to a particular host/domain/ip address, a threshold is set whereupon a notification will be sent to an administrator if the threshold likelihood is exceeded by the estimated likelihood of malicious behaviour associated with a particular host device (or domain name or IP address) having been exceeded. In the present embodiment, such a threshold may be set at 0.7 (i.e. 70%) by default although this figure is preferably able to be set to any value by the administrator.

In the present embodiment, the default action which is taken when the threshold is exceeded is to send a message (e.g. by email and/or an SNMP message (or any other message passing protocol)). However, as mentioned above, the administrator may instead configure the MBD to send a message (e.g. by SNMP) to the gateway/router device 30 so as to cause it to block packets of data to/from hosts believed to be sending malicious packets, etc. If the suspected device is a host device on the LAN 20 it can be quarantined by, for example, blackholing any traffic originating from the device and possibly additionally disabling any port to which the host is connected to the network, etc.

Figure 3A:
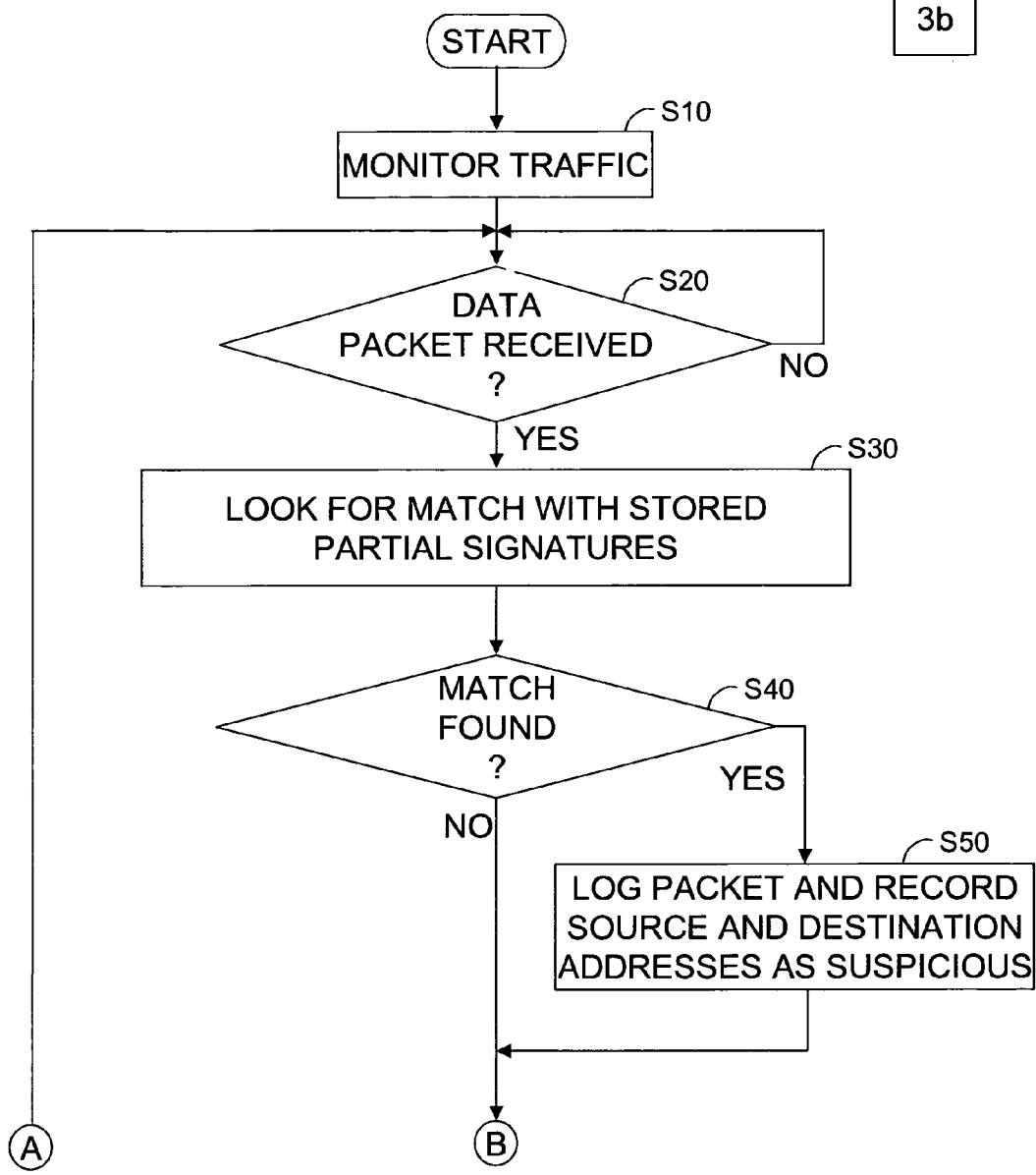
FIG. 3 is a flow chart illustrating the steps carried out by the Malicious Behaviour Detector of FIGS. 1 and 2.
Figure 3B:
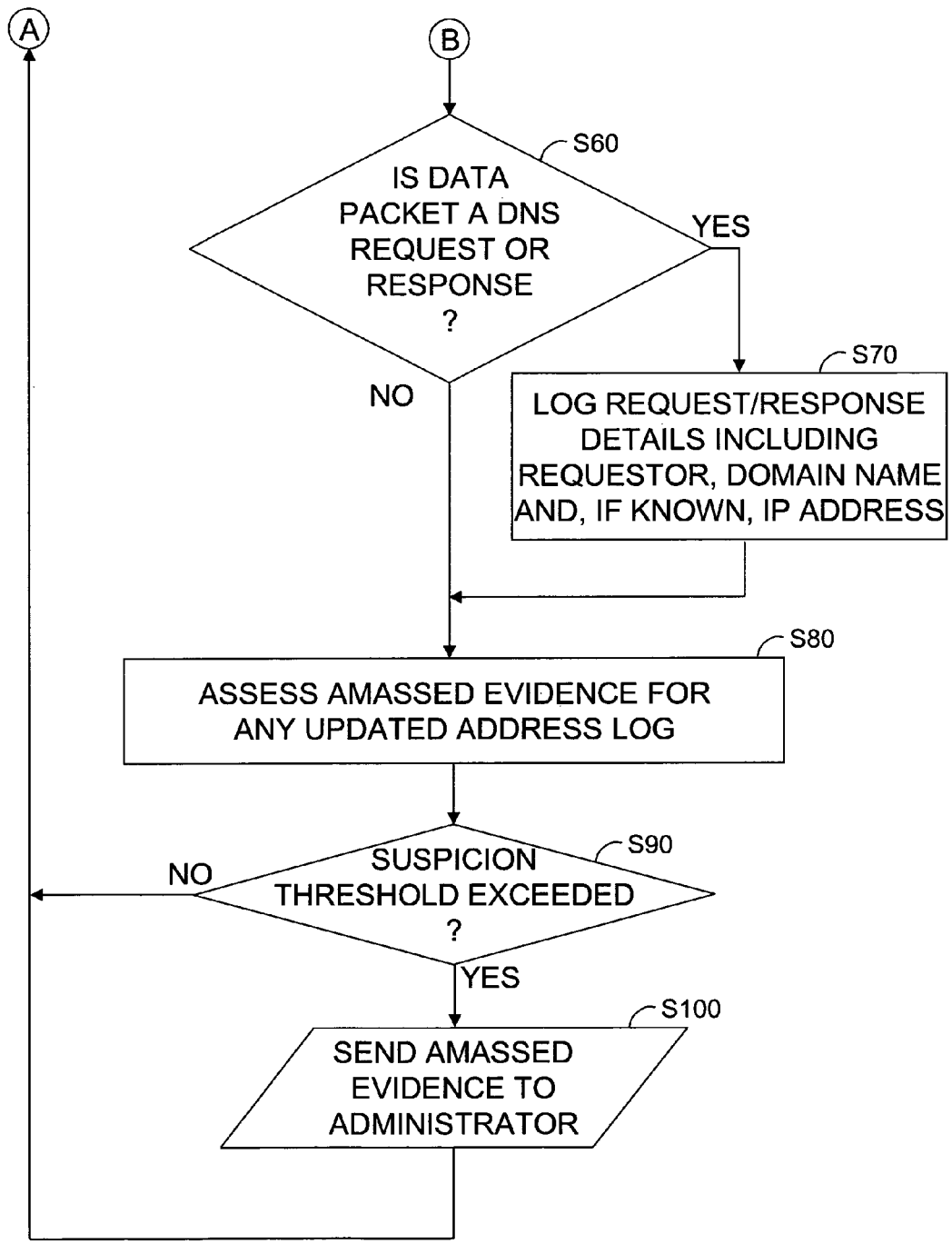

FIG. 3 illustrates the operation of the MBD 100 of the present embodiment in carrying out a method of detecting malicious behaviour. The method commences and thereafter at steps S10 and S20 the MBD 100 monitors all traffic passing on the LAN 20 and awaits receipt of an Ethernet frame by looping through steps S10 and S20 until such a frame of data is received whereupon the method proceeds to step S30.

At step S30, the method looks to see if a match can be found between any data (preferably just payload data rather than header data—and most preferably just the innermost payload data as it would be interpreted by the destination device) contained in the received frame and any of a number of stored signatures (these being in the present embodiment memory addresses specific to particular operating systems). Most preferably the actual signatures used for matching against data contained in monitored traffic will depend upon the destination device, if the operating system running on the destination device is known to the MBD 100. As mentioned above the signature matching is performed by the MBD 100 under the control of the signature matching module 132.

In step S40 it is determined if a match has been found in the preceding step, if it has then the method proceeds to step S50 in which the details of the frame in which the signature matching data was found are logged (under the control of the logging module 136), these details including at least the various source and destination addresses (and IP port information) as well as the signature that has been matched and preferably an identification of the destination application to which the data was ultimately directed. The method then proceeds to step S60. If at step S40 it is determined that no match has been found for the frame under inspection, then the method omits step S50 and proceeds directly from step S40 to step S60.

At step S60 it is determined (under the control of the DNS request detection module 134) if the frame being considered contains a DNS message, if so then the method proceeds to step S70 in which the details of the DNS message (and any accompanying envelope information of interest) are logged (under the control of the logging module 138) and then the method proceeds to step S80. As in step S50, the details which are logged in step S70 include any source and destination addresses including socket port numbers derivable from the received frame, but also additionally included are details of the domain name being queried, the corresponding target IP address if the message is a response, and the qtype of the message. If at step S60 it is determined that the received frame does not include a DNS message, then the method proceeds directly to step S80 instead of passing first to step S70.

At step S80 the MBD 100 (under the control of the evidence assessment module 138) assesses the amassed evidence for any devices (host devices, Domain names or IP addresses) for which the received frame being processed has produced new evidence (thus only if some new evidence has been logged will some action be taken in step S80). If there has been some new evidence logged for a particular device (or domain name or IP address, etc.) then this is taken into account together with all previously logged evidence (which is still extant—evidence which has already timed out is not stored and is not taken into account when assessing evidence against a particular device, etc.) to form an overall estimated likelihood of malicious behaviour being associated with that device (or domain name or IP address, etc.) and this (or these, in the case where new evidence has been added in respect of more than one device (or domain name or IP address, etc.)) is (or are) then compared with the threshold likelihood and the method proceeds to step S90 where it is determined if the threshold has been exceeded by the accumulated evidence in respect of the (or each) device (or domain name or IP address, etc.) and if the threshold has been exceeded (by the or any of the devices, etc.) then in step S100 the amassed evidence (for the or each device, etc. for which the threshold is exceeded) is sent to the administrator in a warning message so that the administrator can decide what action to take about the suspected malicious behaviour and then the method returns to step S10 to monitor the LAN 20 for more traffic passing on the LAN. In the event that it is determined in step S90 that no amassed evidence has exceeded the threshold, then the method simply returns directly to step S10 to monitor for more traffic passing on the LAN with sending any messages to the administrator at step S100.

Variations

Several variations are possible to the above described embodiment and are intended to be covered by the accompanying claims. In particular, although the above embodiment has been described with the MBD 100 located within a LAN, this is not necessary and it can be usefully deployed in many very different network architectures and at many different positions within such architectures. Furthermore, it will be apparent that if it is not located within an Ethernet LAN as in the above embodiment it will naturally monitor different traffic flows rather than Ethernet frames. For example within an ATM network it would monitor ATM cells rather than Ethernet frames, etc. The MBD could also usefully be located at an aggregation point of an access network utilising DSL. For example it could be located with a DSLAM or a multi-service access node, etc. for monitoring a large number of devices connecting to the Internet via an xDSL connection between a user device and a wide area network, etc.

Although it has not been explicitly discussed above, it will be apparent that the logging may conveniently be done on an entity by entity basis (where an entity could be represented by a host ID—e.g. a MAC address of the host—an IP address or a domain name). It is also apparent that the relevance of a particular piece of evidence to a particular entity may depend greatly on the role played by that entity in the piece of evidence. i.e. if a signature has been matched in a transmission from a source device to a destination device, the evidence against the source device should probably be higher than that assigned to the destination device. (This is the case since even if the transmission is malicious, and contains say a worm, it is possible that the victim device may successfully defend against the infection and thus not become compromised at all—of course, if the device then starts behaving suspiciously itself it is quite likely that this is because the device has in fact become infected—the combination therefore of detecting a possibly suspicious transmission to a target device and then that target device behaving strangely should probably result in a triggering of an alert message to an administrator—this is preferably dealt with by having a relatively large probability assigned to the occurrence of a matched signature targeted at a victim (e.g. FTP server 14) followed by suspicious DNS behaviour (say an unusual request qtype)—for example a prob of 0.25 could be assigned to the first event per se (i.e. being the target of a matched suspicious signature), and a prob of 0.25 also being assigned to the second event per se, with a further prob of 0.5 being associated with the occurrence of the second event after the first such that the total amassed evidence against the target device being $1-(1-0.25)*(1-0.25)*(1-0.5)=0.72$ which would exceed a threshold of 0.7 and thus trigger an alert to be sent to the administrator).

As discussed above, the key point on which the signature detection process is based is on detecting a vulnerable fixed memory location in the payload of a received message (packet, frame, datagram etc.). Normally, traffic does not have a memory address location in the packet payload. Looking for such vulnerable memory addresses therefore provides a new way of detecting attacks against servers by analysing applications running at those end servers and determining the set of vulnerable memory addresses these applications are loading. These vulnerable memory addresses can then be fed to the Intrusion Detector (ID) (i.e. our MBD 100) to interrogate the traffic travelling towards the server. In addition, by consolidating that approach by looking for suspicious DNS query/response behaviour associated with the server, the false positive rate that might otherwise arise from using short signatures may be reduced.

Note an additional behaviour which can be monitored for and used as an additional piece of evidence in embodiments of the present invention is the occurrence of port scanning by a device.

Figure 4:
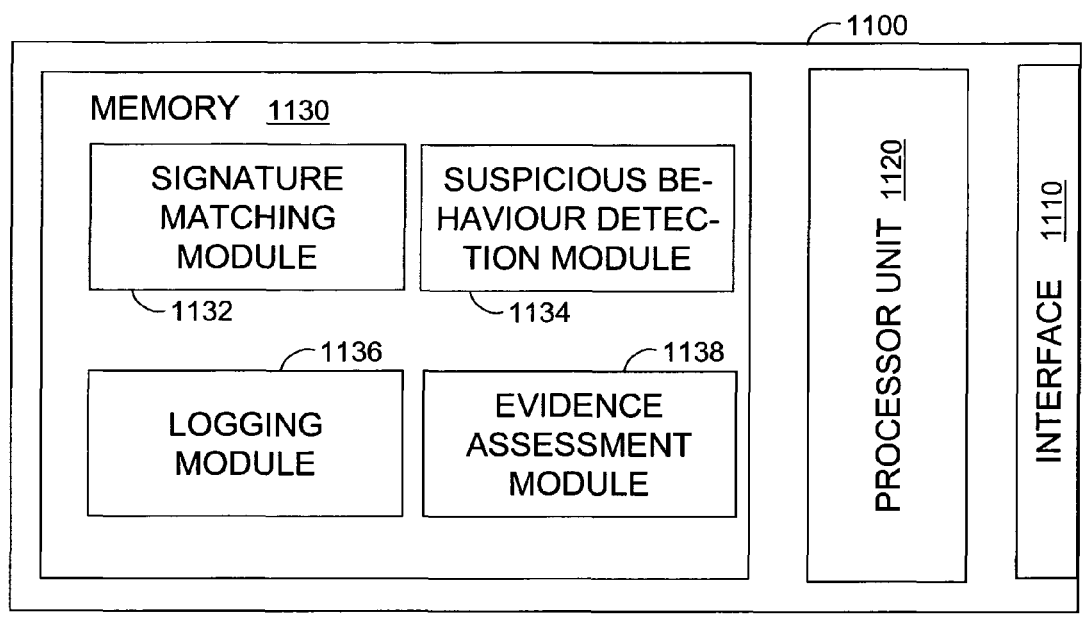
FIG. 4 is a schematic illustration of an alternative embodiment of the malicious behaviour detector of FIG. 1.

Instead of relying on suspicious DNS behaviour, other types of potentially suspicious network behaviour could be monitored. FIG. 4 illustrates such an alternative type of malicious behaviour detector 1100. In general the various components of the MBD 1100 correspond to the equivalent components of the MBD 100 of FIG. 2 except that in place of the DNS request detection module 134 there is a suspicious behaviour detection module 1134 which in the present embodiment looks for suspicious behaviour including the scanning of ports on the local network and the sending of large amounts of emails and/or sending emails to more than one email server or to an unknown email server.

The MBD 1100 comprises an interface 1110 for communicating with the LAN 20, a processor unit 1120 for performing processing functions and a memory 1130. The processor unit 1120 co-operates with the memory 1130 to perform processing functions based on computer program instructions stored in the memory. In particular, in the present embodiment the memory stores sets of computer program code means 1132, 1134, 1136 and 1138 each of which causes the processor unit to perform different functions when executed by the processor means. The four functional modules are a signature matching module 1132, a suspicious (network) behaviour detection module 1134 (discussed above), a logging module 1136 and an evidence assessment module 1138.

The suspicious behaviour detection module 1134 may additionally detect suspicious DNS behaviour as well as suspicious non-DNS behaviour.

The invention claimed is:

1. A method of detecting malicious behavior on a network, the method comprising:
   performing malicious partial signature detection by reading the contents of packets of data passing through the network to look for partial signatures associated with malicious programs, each partial signature having a size that is at most the size of a given packet passing through the network;
   monitoring the Domain Name Service, DNS, requests made by hosts connected to the network and/or responses thereto;
   analyzing the results of the partial signature detection and the DNS monitoring;
   making a determination of the suspected presence of malicious behavior on the network based upon an analysis of the results of both the partial signature detection and the DNS monitoring; and
   in response to a determination that malicious behavior is present, blocking packets exhibiting the malicious behavior.

2. A method according to claim 1 wherein a determination of the suspected presence of malicious behavior on the network is more likely to be made if suspicious DNS requests and/or responses are detected in respect of a host to which a packet of data has previously been sent, within a predetermined period of time, in which a partial signature has been detected, compared to a case of a host to which no packet of data has been detected as having been sent within a predetermined period of time containing a partial signature.

3. A method according to claim 2 wherein the partial signature comprises a memory location or range of memory locations known to be associated with a buffer overflow exploit.

4. A malicious behavior detector for detecting malicious behavior on a network, comprising:
   a processor unit and associated system memory containing computer program code for providing:
   a signature matching module to perform malicious partial signature detection by reading the contents of packets of data passing through the network to look for partial signatures associated with malicious programs, each partial signature having a size that is at most the size of a given packet passing through the network;
   a Domain Name Service, DNS, request and/or response detection module to monitor DNS requests made by hosts connected to the network and/or responses thereto; and
   an evidence assessment module to analyze the results of the partial signature detection and the DNS monitoring to make a determination of the suspected presence of malicious behavior on the network based upon the analysis of the results of both the partial signature detection and the DNS monitoring,
   wherein the evidence assessment module is further configured to, in response to a determination that malicious behavior is present, block packets exhibiting the malicious behavior.

5. A method according to claim 1 wherein each partial signature has a size that is no larger than a common packet size of the packets passing through the network.

6. A method according to claim 1 wherein the malicious partial signature detection is performed on a packet-by-packet basis.

* * * * *